UNITED STATES PATENT OFFICE.

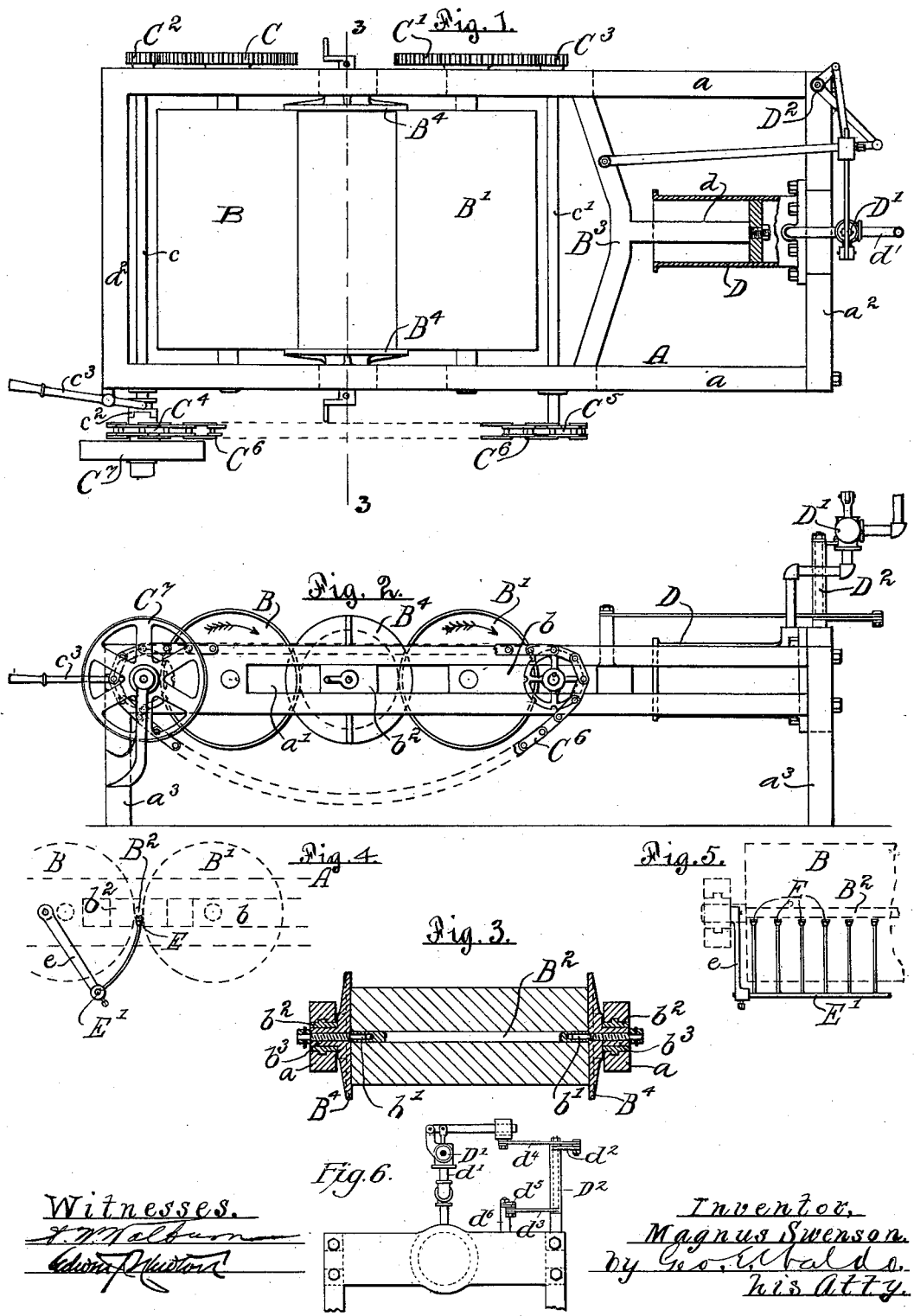

MAGNUS SWENSON, OF CHICAGO, ILLINOIS, ASSIGNOR, BY MESNE ASSIGNMENTS, TO THE AMERICAN COTTON COMPANY, OF NEW YORK, N. Y.

COTTON-PRESS.

SPECIFICATION forming part of Letters Patent No. 614,186, dated November 15, 1898.

Application filed March 26, 1895. Serial No. 543,244. (No model.)

*To all whom it may concern:*

Be it known that I, MAGNUS SWENSON, a resident of Chicago, in the county of Cook and State of Illinois, have invented certain Improvements in Cotton-Presses, of which the following is a specification.

These improvements relate to the class of cotton-presses in which a cotton-bat is wound under pressure into a bale of cylindrical form. In this class of presses as heretofore constructed the bat has been wound upon a core adapted to rotate upon a horizontal axis and mounted in movable bearings above a compression-cylinder rotating upon a horizontal axis and mounted in fixed bearings and beneath a bodily-movable compression-cylinder rotating on a horizontal axis and mounted in vertically-sliding bearings.

The objects of the present invention are, first, to lessen the number of parts and to simplify the construction of the apparatus; secondly, to facilitate the feeding of the cotton-bat to the bale in process of formation, and also to facilitate the discharge of the finished bale, and, finally, to positively control the entire action of the compressing instrumentalities. These objects are accomplished by mounting the compression-roll rotating in fixed bearings, the rotating core, and the compression-roll rotating in sliding bearings side by side with their axes in the same plane in such manner as to secure an open vertical space between the opposed sides of the two compression-rolls. The advantages of this organization of the apparatus are as follows: First, the cotton as it comes from the gin is fed to the bale in process of formation along a path which is either horizontal or inclined slightly in a downward direction, so that there will be no pulling apart of the bat due to longitudinal strain, as there occasionally is when the bat is required to be fed in an upward direction to reach the bale in process of formation; secondly, when the bale is completed and inclosed in the sacking by which it is covered it is readily discharged by being allowed to drop bodily downward from the space between the two compression-rolls, and, thirdly, the weight of the movable compression-roll as a component of the compressing force is eliminated by mounting the said roll in sliding boxes supported and traveling upon horizontal guides, the said boxes being rigidly connected with each other and with the movable member of a hydrostatic press, by means of which all the bodily movements of the bodily-movable compression-roll and the degrees of compression to which the bale in process of formation is subjected are always positively controlled and regulated.

The accompanying drawings, representing a press embodying the improvements, are as follows:

Figure 1 is a top view. Fig. 2 is a side elevation. Fig. 3 is a transverse vertical section on the plane indicated by the dotted line 3 3 on Fig. 1. Figs. 4 and 5 are diagrammatic views showing the guides for conducting the bat of cotton around the baling-spool at the beginning of the formation of the bale. Fig. 6 is an enlarged end view of the mechanism for moving the governor-valve weight to increase its leverage as the bale in process of formation enlarges in diameter.

Referring now to the drawings, A is the main frame of the press, in which the operative parts thereof are supported, said frame comprising, first, the horizontal side pieces $a$, in which are formed the longitudinal guide slots or ways $a'$; secondly, the cross-pieces $a^2$, connecting the ends of the side pieces $a$, and, thirdly, the legs or supports $a^3$.

As shown, the operative parts of the press comprise the usual compression-rolls B B' and the baling-core $B^2$, located between the same. The compression-roll B is supported in stationary bearings formed in the main frame A, adjacent to one end thereof, and the compression-roll B' in suitable bearings formed in sliding blocks $b$, adapted to slide in the guide slots or ways $a'$, in which they are so seated as to prevent their lateral displacement. The said blocks $b$ are secured to a cross-head $B^3$, the function of which will be hereinafter described. The core $B^2$, upon which the bat is wound to form the bale, is a cylindrical shaft tubular at its ends to admit the inwardly-projecting stems of the screw-bolts $b'$, which are inserted in holes tapped through the trunnions $b^3$ of the disks $B^4$, which form the heads of the spools. The trunnions $b^3$ rotate in the boxes $b^2$, which, like the blocks $b$, are adapted to slide in the guide slots or ways $a'$.

The compression-rolls are rotated positively in the same direction, as indicated by the arrows in Fig. 2, in the following manner: Secured to the shafts of the said rolls are spur-gears C C', which mesh with the pinions $C^2 C^3$, which are rigidly secured to the driving-shaft $c$ and to the counter-shaft $c'$, respectively. The driving-shaft $c$ is mounted in stationary bearings formed in the main frame A. The counter-shaft $c'$ is mounted in suitable bearings formed in the sliding blocks $b$. Mounted upon the shafts $c c'$, on the opposite side of the press from the said gear-wheels, are sprocket-wheels $C^4 C^5$, which engage a chain belt $C^6$, which is of such length as to allow the movable compression-roll B' to be retracted a sufficient distance to permit the formation upon the core $B^2$ of a bale of desired size. It is obvious that when the core is empty or the bale small the said chain belt will be considerably longer than necessary, but this is immaterial, because the driving strain will always take up the slack of the side of the belt upon which the duty comes, and thus always keep it taut, as illustrated in Fig. 2.

Power to drive the press is usually transmitted by a belt engaging the driving-pulley $C^7$, rigidly secured to the driving-shaft $c$. The sprocket-wheel $C^4$ is mounted loosely upon the driving-shaft $c$ and driven therefrom by means of an ordinary clutch $c^2$, loosely splined to said shaft and provided with teeth, which, when the clutch is appropriately adjusted, engage corresponding teeth formed on the adjacent face of the hub of the sprocket-wheel $C^4$.

The clutch $c^2$ is operated by means of the usual forked clutch-lever $c^3$ for establishing or disestablishing the engagement of the sprocket-wheel $C^4$ with the driving mechanism, and thus, as the case may require, either compelling the compression-roll B' to partake of the rotatory movement of the compression-roll B or stopping the rotation of the compression-roll B' without stopping the rotation of the compression-roll B.

The cross-head $B^3$, hereinbefore referred to, is rigidly connected by means of a suitable piston-rod $d$ with a piston $d^7$, fitted to a cylinder D, secured to the frame A in proper relation to the plane of bodily movement of the roll B'. Preparatory to the commencement of the baling operation water or other elastic fluid under prescribed pressure is forced into the cylinder D behind the piston $D^7$, which, being thereby driven forward, pushes forward the movable compression-roll B' until its motion is arrested by collision with the core $B^2$ or with the convolution of bat initially wound thereon. As the operation of winding the bat upon the core proceeds the increasing diameter of the bale compels the compression-roll to yield bodily. By means of the connection of its movable bearing-blocks through the cross-head $B^3$ and the piston-rod $d$ with the piston $d^7$ the backward bodily movement of the roll B' pushes the piston $D^7$ into the cylinder D and drives out the operating fluid therefrom through an automatically-regulated weighted governor-valve D', which is inserted in the service-pipe $d'$.

Preferably the water or other operating fluid is supplied from an elevated tank, to which it is returned on being expelled from the cylinder D. By erecting such tank at a sufficient distance above the cylinder a sufficient head of water may be obtained to furnish the required force to move the compression-roll B' forward after the bale has been fully formed and discharged.

It will be perceived that the degree of compression exerted upon the bale in process of formation is that which results from the resistance which the operating fluid in the cylinder D opposes to the inward movement of the piston $d^7$. It will therefore be evident that if the area of the outlet which the governor-valve affords be diminished or the force tending to close the governor-valve be increased the resistance to the inward movement of the piston $d^7$, and hence the degree of compression upon the bale in process of formation, will be correspondingly increased.

It is desirable that there should be a gradual increase in the degree of compression to which the bale is subjected as it gradually enlarges in diameter. To this end the governor-valve is constructed like a safety-valve, which is held down upon its seat by the bearing upon the upper end of the valve-stem of a lever provided with a sliding weight. The position of the said weight upon the said lever is automatically controlled by means of a bell-crank lever pivoted in a sleeve $D^2$, erected upon the frame A and having one of its arms $d^2$ connected by means of a pitman $d^4$ with the said valve-weight and having its other arm $d^3$ connected by means of a pitman $d^5$ with a pivot-pin $d^6$, affixed to the cross-head $B^3$, the organization of the parts being such that as the bale in process of formation increases in diameter the said weight is gradually pulled toward the free end of the valve-lever, thus increasing the downward pressure of the valve toward its seat and correspondingly increasing the measure of resistance to the expulsion of the operating fluid from the cylinder D.

In order to facilitate the guiding of the bat of cotton around the core $B^2$ for the purpose of beginning the formation of a bale, there may be employed a guiding device consisting, preferably, of a plurality of plates E, rigidly fixed to a bar $E^2$, secured at its ends to the extremities of radius-arms E, pivotally connected to the main frame A of the press just in front of the bearings of the compression-roll B. The plates E are concave and present their concave surface toward the roll B. The edges of the plates bear upon the perimeter of the roll B and are thus adapted to act as strippers to detach the bat of cotton from the roll B and to guide it toward the core B².

The operation of the press is as follows: The bale, having been wound to the desired diameter, is inclosed in a strip of sacking, which may be wound around it either while it is still in the press or after it has been discharged from the press. When the completed bale is to be discharged, the screw-bolts $b'$ are unscrewed and their stems thus withdrawn from the ends of the bale-core B². The clutch-lever is then so operated as to disengage the clutch from the sprocket-wheel C⁴, thus throwing the compression-roll B' out of direct engagement with the driving mechanism. As the compression-roll B continues to rotate the completed bale is rolled bodily downward by the frictional bearing upon its periphery of the downwardly-moving side of the compression-roll B.

It results from the horizontal arrangement and general organization of the press that the spaces immediately above and immediately below that occupied by the bale are unobstructed. It hence follows that the bat can be fed to the bale in a downward direction without being subjected to any pulling strain, and it further follows that the completed bale is readily discharged by the action of the rotating compression-roll B, which rolls the bale out of its place between the two rolls in a downward direction toward the floor, upon which the press is erected.

To repeat the baling operation, the machine may be stopped, and a new core having been first enveloped with one or more convolutions of the bat may then be lowered down and introduced between the disks B⁴ B⁴ and centralized by the insertion into its tubular ends of the stems of the screw-bolts $b'\ b'$. In the meantime, if desired, the governor-valve D' may be kept closed and the compression-roll B' be thereby kept back, so that it will not interfere with the lowering of the new core into its place. It is not, however, essential that the core shall be first enveloped with any portion of bat before being lowered to its place, because the operation of initially supplying the bat to the core may be performed after the core is in place. At the appropriate time, as the case may be, the valve D' is opened, and the operating fluid being thus let into the cylinder D the compression-roll B' is pushed forward until it is brought up by collision either with the surface of the core or with the initial convolutions previously wound upon the core. The machine is then started and the operation proceeds as before.

What is claimed as the invention is—

1. In a rotary cotton-press the combination as herein set forth of a compression-roll rotating in fixed bearings, a bodily-movable compression-roll, a bale-core mounted in sliding bearing-blocks between said compression-rolls, sliding bearing-blocks rigidly connected to each other for affording the bearings for said bodily-movable compression-roll, substantially horizontal parallel guides for said sliding bearing-blocks, whereby the said compression-rolls and core are constantly maintained side by side with their geometrical axes in the same plane, and in such manner as to present a vertically-unobstructed space between the opposed sides of said compression-rolls for occupancy by the said core and the bale wound thereon, means for rotating said compression-rolls and means for producing pressure of the compression-rolls upon the bale in process of formation.

2. In a rotary cotton-press employing a rotatable bale-core and two compression-rolls upon the opposite sides of said bale-core, means for supporting said bale-core, and a clutch adapted to disengage from the driving mechanism of the press one only of said compression-rolls for effecting the discharge of the completed bale by the continued rotation of the other compression-roll, substantially as set forth.

3. In a rotary cotton-press employing a rotatable bale-core and two compression-rolls upon the opposite sides of said bale-core, and bearings for said bale-core, means for releasing said bale-core from engagement with said end bearings and a clutch adapted to disengage from the driving mechanism of the press one only of said compression-rolls for effecting the discharge of the completed bale by the continued rotation of the other compression-roll, as herein set forth.

4. In a rotary cotton-press the combination as herein set forth of a compression-roll rotating in fixed bearings, a bodily-movable compression-roll, a bale-core mounted in sliding bearing-blocks between said compression-rolls, sliding bearing-blocks rigidly connected to each other for affording the bearings for said bodily-movable compression-roll, substantially horizontal parallel guides for said sliding bearing-blocks, driving mechanism for imparting rotatory movement to said compression-rolls, the said driving mechanism including a counter-shaft mounted in fixed bearings upon the frame of the machine, and another counter-shaft mounted in the said rigidly-connected sliding bearing-blocks in which the bodily-movable compression-roll is mounted, sprocket-wheels arranged in appropriate alinement on said counter-shafts, and a chain belt adjusted to said sprocket-wheels.

5. In a rotary cotton-press, the combination, as herein set forth, of a rotatable bale-core, two compression-rolls upon the opposite sides of said bale-core, the said compression-rolls and core being arranged side by side with their geometrical axes in the same plane and in such manner as to present a vertically-unobstructed space between the opposed sides of said compression-rolls for occupancy by the said core and the bale wound thereon, driving mechanism for imparting rotary movement to said compression-rolls, said driving mechanism comprising shafts carrying pinions which engage gears secured to the shafts of the compression-rolls, and a chain belt adjusted to sprocket-wheels secured to said pinion-shafts, one of said compression-rolls being driven through the medium of a clutch, whereby it may be engaged or disenagaged from the driving mechanism, substantially as described.

6. In a rotary cotton-press the combination as herein set forth of a compression-roll rotating in fixed bearings, a bale-core and a bodily-movable compression-roll rotating in sliding bearings, the said compression-rolls and core arranged side by side with their geometrical axes in the same plane and in such manner as to present a vertically-unobstructed space between the opposed sides of said compression-rolls for occupancy by the said core and the bale wound thereon, driving mechanism for imparting rotary movement to said compression-rolls, said driving mechanism comprising shafts carrying pinions which engage gears secured to the shaft of the compression-rolls, and a chain belt adjusted to sprocket-wheels secured to said pinion-shafts, one of the compression-rolls being driven through the medium of a clutch, whereby it may be engaged or disengaged from the driving mechanism, substantially as described.

7. In a rotary cotton-press the combination with a bale-core and compression-rolls arranged in a horizontal series, of concave guide-surfaces formed on plates or blocks pivotally supported beneath the press, the relation of the parts being such that as said plates are moved pivotally, the edges thereof will come into contact with the perimeter of the compression-roll B just before the surface of said guides acquire contact with the bale-core or with the bat wound thereon, substantially as described.

8. In a rotary cotton-press, the combination of a bale-core, compression-rolls arranged with their geometrical axes in a horizontal plane, means for imparting rotation to said compression-rolls, sliding bearing-blocks for affording bearings for one of said compression-rolls, a cross-head rigidly connected to said bearing-blocks, a piston-rod secured to said cross-head and affixed to a piston fitted to a cylinder, means to produce pressure upon said piston within said cylinder, whereby the movable compression-roll will be held yieldingly in contact with the baling-core or with a bale in process of formation thereon, with a prescribed degree of force corresponding to the said pressure in the said cylinder.

9. In a rotary cotton-press, the combination of a bale-core and compression-rolls arranged with their geometrical axes in the same plane, sliding bearing-blocks affording the bearings for one of said compression-rolls and connected to the cross-head of a piston-rod, the said piston-rod connected to a piston fitted to reciprocate in a cylinder, an exit from said cylinder, a valve controlling said exit, a lever provided with a sliding weight for pressing said valve toward said exit, and connections from said cross-head to said weight for automatically pulling said weight toward the free end of said valve-lever as the bale enlarges in diameter, substantially as and for the purposes set forth.

10. In a rotary cotton-press the combination of a bale-core and compression-rolls arranged with their geometrical axes in the same plane, sliding bearing-blocks, affording the bearings for one of said compresssion-rolls and connected to the cross-head of a piston-rod, the said piston-rod connected to a piston fitted to reciprocate in a cylinder, a pipe communicating with said cylinder, a valve in said pipe, a lever provided with a sliding weight for pressing said valve toward its seat, connections from said cross-head to said weight for automatically pulling said weight toward the free end of said valve-lever as the bale enlarges in diameter, substantially as and for the purpose herein set forth.

11. In a rotary cotton-press, the combination of a bale-core, compression-rolls, means for imparting rotation to said rolls, sliding bearing-blocks for affording the bearings for one of said compression-rolls, substantially parallel horizontal guides for said sliding bearing-blocks, a cross-head rigidly connected to said bearing-blocks and to a piston-rod affixed to a piston fitted to a cylinder, a pipe communicating with said cylinder and a governor-valve in said pipe, substantially as described.

12. In a rotary cotton-press the combination of a bale-core, compression-rolls, means for imparting rotation to said compression-rolls and means for engaging and disengaging one of said compression-rolls from its driving mechanism, sliding bearing-blocks for affording the bearings for one of said compression-rolls, a cross-head rigidly connected to said bearing-blocks and to a piston-rod affixed to a piston fitted to a cylinder, a pipe communicating with said cylinder and a governor-valve in said pipe substantially as described.

13. In a rotary cotton-press the combination of a bale-core and compression-rolls, means for imparting rotation to said compression-rolls, sliding bearing-blocks affording the bearings of one of said compression-rolls, said sliding bearings rigidly connected to the cross-head of a piston-rod affixed to a piston fitted to a cylinder, a pipe communicating with said cylinder, a governor-valve in said pipe, a valve-lever, a sliding weight on said valve-lever, a bell-crank lever pivoted to the frame of the press, one arm of said bell-crank lever connected by a pitman to said weight and the other arm of said bell-crank lever connected by a pitman to said cross-head, as and for the purpose described.

14. In a rotary cotton-press the combination of a bale-core and compression-rolls, means for imparting rotation to said compression-rolls, and means for engaging and disengaging one of said compression-rolls from its driving mechanism, sliding blocks affording the bearings for one of said compression-rolls, said sliding blocks being rigidly connected to the cross-head of a piston-rod affixed to a piston fitted to a cylinder, an adjustable weighted governor-valve in said pipe, a bell-crank lever pivoted to the frame of the press, one arm of which is connected by a pitman with the governor-valve weight and the other arm to a stud secured in said cross-head, the relation of the parts being such that the leverage of the valve-weight will increase as the bale enlarges in diameter, substantially as described.

15. In a cotton-press for making cylindrical bales, the combination with baling-rolls between which the bale is formed, said rolls separating as the bale enlarges in size, of regulable tension-producing mechanism coöperating with the baling-rolls and resisting the tendency of the same to separate, said tension-producing mechanism being provided with a lever and with a weight movable longitudinally thereon for effecting changing degrees of tension in the tension-producing mechanism, and automatic means for moving said weight longitudinally on said lever as the bale enlarges, whereby the bale will be subjected to gradually-increasing pressure, substantially as set forth.

16. In a cotton-press for making cylindrical bales, the combination with baling-rolls between which the bale is formed, said rolls separating as the bale enlarges in size, of regulable tension-producing mechanism coöperating with the baling-rolls and resisting the tendency of the same to separate, said tension-producing mechanism being provided with a lever and with a weight movable longitudinally thereon for effecting the changing degrees of tension in the tension-producing mechanism, and connections between a baling-roll and said weight for moving said weight longitudinally on said lever as the bale enlarges, whereby the bale will be subjected to gradually-increasing pressure, substantially as set forth.

In testimony that I claim the foregoing as my invention I hereunto set my hand this 19th day of March, 1895.

MAGNUS SWENSON.

Witnesses:
HERMAN E. STURCKE,
ALBERT W. WALBURN.